United States Patent [19]

Murakawa et al.

[11] Patent Number: 4,543,312

[45] Date of Patent: Sep. 24, 1985

[54] MAGNETIC TONER COMPRISING MAGNETIC POWDERS HAVING CONTROLLED SIZE DISTRIBUTION

[75] Inventors: Kazunori Murakawa, Tokyo; Yasuo Mitsuhashi; Hitoshi Uchide, both of Yokohama; Seiichi Takagi; Masaki Uchiyama, both of Tokyo; Hisayuki Ochi, Tokyo; Motoo Urawa, Funabashi; Eiichi Imai, Narashino, all of Japan

[73] Assignee: Canon Kabushiki Kaisha, Tokyo, Japan

[21] Appl. No.: 488,667

[22] Filed: Apr. 26, 1983

[30] Foreign Application Priority Data

Apr. 27, 1982 [JP] Japan .................................. 57-70698
Apr. 27, 1982 [JP] Japan .................................. 57-70699
Apr. 27, 1982 [JP] Japan .................................. 57-70702

[51] Int. Cl.[4] .......................... G03C 1/02; C03G 9/08

[52] U.S. Cl. .................................... 430/107; 106/304; 252/62.51; 252/62.54; 252/62.56; 430/106.6; 430/111; 430/633; 430/634; 430/903

[58] Field of Search ..................... 252/62.56, 62.51 R, 252/62.54; 430/106.6, 903, 111, 107; 423/634, 633; 106/304

[56] References Cited

U.S. PATENT DOCUMENTS

| | | | |
|---|---|---|---|
| 3,674,736 | 4/1972 | Lerman et al. | 430/111 |
| 3,914,181 | 10/1975 | Berg et al. | 430/108 |
| 4,239,845 | 12/1980 | Tanaka et al. | 430/106.6 X |
| 4,256,818 | 3/1981 | Blossey et al. | 252/62.54 X |
| 4,271,248 | 6/1981 | Gaudioso | 252/62.56 X |
| 4,272,600 | 6/1981 | Sypula et al. | 252/62.56 X |
| 4,404,269 | 9/1983 | Miyakawa et al. | 430/106.6 X |

*Primary Examiner*—John E. Kittle
*Assistant Examiner*—Mukund J. Shah
*Attorney, Agent, or Firm*—Fitzpatrick, Cella, Harper & Scinto

[57] ABSTRACT

A magnetic toner comprises magnetic powders having a particle distribution that the particle size of 50% accumulated volume, the particle size of 25% accumulated volume and the particle size of 75% accumulated volume of the magnetic powders are 1.5–4.5μ, 1.0–4.0μ and 2.5–6.0μ, respectively. This magnetic toner can produce high density and clear images and further, can produce colorful images.

23 Claims, 2 Drawing Figures

MAGNETIC TONER COMPRISING MAGNETIC POWDERS HAVING CONTROLLED SIZE DISTRIBUTION

BACKGROUND OF THE INVENTION

1. Field of the Invention

This invention is concerned with a magnetic toner which may be used for electrophotographic methods, electronic printing methods, electrostatic recording methods, magnetic recording methods and the like, and more particularly, to a magnetic color toner.

2. Description of the Prior Art

The electrophotographic method comprises producing electrostatic latent images by utilizing a photoconductive member such as cadmium sulfide, polyvinylcarbazole, selenium, zinc oxide and the like, for example, imparting uniformly electric charge onto the photoconductive layer to form electrostatic latent images by imagewise exposure, and developing the latent image with toner particles charged oppositely to the charge of the latent images, and if desired, transferring the developed images onto a receiving sheet followed by fixing.

Electronic printing methods comprise utilizing electric field to introduce charged powdered toner onto a recording member and fixing and thereby printing as disclosed in West German Pat. No. 1203808.

Electrostatic recording methods comprise imagewise imparting electric charge to a dielectric member, attaching charged toner particles thereto and fixing the toner particle. Magnetic printing also comprises forming magnetic latent images on a recording member, developing the latent images with toner powders containing a magnetic material, transferred to receiving sheet and fixing.

In case that one-component magnetic toners (not using carrier particles) are used in a developing system in the above-mentioned methods, the toner is transferred by a magnet roll to form a magnetic brush, and the magnetic brush contacts a photoconductive member such as cadmium sulfide and the like or an insulating electrostatic charge bearing member, and thereby the electric charge on the bearing member attracts the toner having an induced electrostatic charge or a triboelectric charge. As the result, the toner particles attach to the electrostatic charge bearing member to develop. This development with a one-component magnetic toner does not require a device for keeping the concentration of toner particles in the developer constant during development as used for development with a two-component developer containing carrier particles. Therefore, the developing apparatus is simple, inexpensive and small.

On the other hand, copiers have been recently used widely in various ways, and small, inexpensive multicolor copiers capable of producing colored copies are now demanded.

It is not possible to hide the color of the magnetic material by simply adding a colorant to a binder resin. For example, according to Japanese patent application Laid-open No. 42539/1976, magnetic powders are coated with a white pigment by a chemical treatment, but the color of magnetic material can not be suffcently hidden by a simple chemical treatment as far as the magnetic powder amount and the dye or pigment amount are such that they do not adversely affect the development characteristics.

In order to obtain a toner of a desired tone by the abovementioned method, the amount of the magnetic material is to be decreased or the amount of the colorant is to be increased but if the amount of the magnetic material is decreased too much, the developing property is lowered which if the amount of the colorant is increased too much, the developing property and the fixability is lowered.

When a large particle size of the magnetic material was employed and the coloring power of the magnetic material was decreased, the large particles of the magnetic material were not sufficiently dispersed in the resin and the developing properties of the magnetic toner were poor, for example, irregular images were formed, fogging was caused by the particles in which the magnetic material was not contained, and the durability was so low that the resulting images were deteriorated.

In such a manner, it has been difficult to produce a magnetic toner satisfying all of the characteristics such as developing property, tone, fixability and the like.

The present inventors have found that the above mentioned drawbacks can be solved by using magnetic powders having certain particle sizes and a sharp particle size destribution.

SUMMARY OF THE INVENTION

An object of the present invention is to provide a magnetic toner capable of producing clear images of high density and free from fog.

Another object of the present invention is to provide magnetic toners capable of producing colorful images.

A further object of the present invention is to provide inexpensive color magnetic toners capable of being easily produced.

Still another object of the present invention is to provide magnetic color toners excellent in developability, transferability, fixability and cleaning property.

A still further object of the present invention is to provide a magnetic color toner excellent in durability and stability against environmental changes.

According to the present invention, there is provided a magnetic toner comprising at least magnetic powders and a binder resin, characterized by the particle size distribution of the magnetic powders that the particle size of 50% accumulated volume, the particle size of 25% accumulated volume and the particle size of 75% accumulated volume of the magnetic powders are 1.5–4.5μ, 1.0–4.0μ and 2.5–6.0μ, respectively.

In this invention, the term "particle size of 50% (25% or 75%) accumulated volume" is intended to denote the particle size of the particle Pn as defined below. Particles of a group of particles are arranged from the smallest particle towards the largest particle, and the volumes of the particles are summed from the smallest particle towards the largest particle and the summed volume reaches 50% (25% or 75%) of the total volume of the all particles of said group. The last particle the addition of which results in the 50% (25% or 75%) of the total volume is designated as Pn.

DESCRIPTION OF THE PREFERRED EMBODIMENTS

Figure 1:
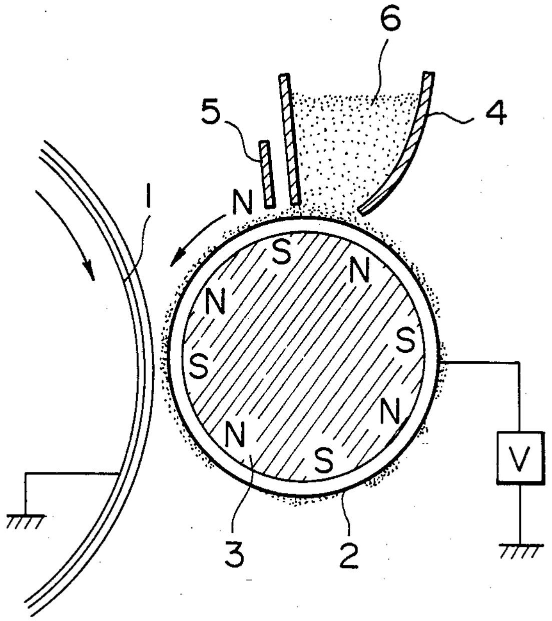
FIG. 1 is a cross sectional view of an embodiment of a developing apparatus which may be used for development with the magnetic toner according to the present invention.

The magnetic powders used in the present invention have the particle size distribution that the particle size of 50% accumulated volume is 1.5–4.5μ, preferably 2.0–4.0μ, the particle size of 25% accumulated volume is 1.0–4.0μ, preferably 1.5–3.5μ, and the particle size of 75% accumulated volume is 2.5–6.0μ, preferably 3.0–5.0μ.

The material for the magnetic powders may be ferromagnetic elements, alloy or compounds containing a ferromagnetic element. For example, there may be mentioned alloys and compounds containing iron, coblat, nickel, manganese or the like such as magnetite, γ-hematite, ferrite and the like, other ferromagnetic alloys, and various known magnetic materials.

In particular, magnetite and the like are suitable for blue or green magnetic toners and γ-hematite and the like are suitable for yellow or red magnetic toners.

The particle size range of magnetic powders used in the present invention is as defined above for the following reasons. When the particle size is larger than the range, coloring with a colorant is easy, but the dispersion of magnetic powders in the toner particles is liable to become nonuniform and, in addition, toner particles not containing magnetic powders are liable to be produced resulting in formation of irregular images and fog, and in particular, such undesirable tendency is stronger under low humidity conditions.

On the contrary, when the particle size of magnetic powders is smaller than the range, coloring with the magnetic powders is so strong that coloring with a colorant other than the magnetic powders is difficult.

The above mentioned magnetic powders may be produced by a method of grinding, a method of growing the particles upon precipitation of a wet type, a method of sintering the magnetic material, or a method of growing the particles by using a flux. In particlar, the sintering or the flux method is preferable since the particle size distribution can be narrow. In particular, it is more preferable that the magnetic powders produced by the sintering or the flux method are contained in an amount of 60% by weight or more, preferably 80% by weight or more based on the total magnetic powders. If necessary, the magnetic powders may be subjected to surface treatment such as titanium coupling treatment and the like, or a coloring treatment such as dyeing and the like.

In particular, when the magnetic powders are used for a magnetic color toner, the number average particle size observed by an electron microscope is preferably 0.5–3.5μ, more preferably 1.0–2.5μ, and the specific surface area determined by a BET nitrogen adsorption method is preferably 0.5–3.0 $m^2/g$, more preferably 1.0–2.5 $m^2/g$.

The magnetic toner according to the present invention contains at least magnetic powders and a binder resin, and the ratio is preferably 100 parts by weight of the binder resin to 20–120 parts by weight, more preferably 20–100 parts by weight, further more preferably 30–80 parts by weight, of the magnetic powders, and if a colorant is contained, preferably 1–20 parts by weight, more preferably 5–15 parts by weight of the colorant is added to 100 parts by weight of the binder resin.

As a method for producing the magnetic powders by sintering, there may be mentioned, for example, in the case of $Fe_3O_4$, a method comprising heating a starting material, α-$Fe_2O_3$ having a specific surface area measured by a BET nitrogen adsorption method of 0.5 $m^2/g$ or more at preferably 700°–1300° C., more preferably 900°–1200° C., in air for 30 min. or more, preferably 30 min.–48 hours to sinter, cooling, grinding, and heating and reducing in a hydrogen or hydrocarbon atmosphere, preferably in propane, to produce sintered $Fe_3O_4$.

As a method of producing the magnetic powders by a reaction in a flux, there may be mentioned, for example, in the case of $Fe_3O_4$, a method comprising heating a starting material, α-$Fe_2O_3$, having a specific surface area of 0.5 $m^2/g$ or more measured by a BET nitrogen adsorption method in a flux such as a $Li_2SO_4$–$Na_2SO_4$ system and the like at 700°–1300° C., preferably 900°–1300° C. for 30 min. or more, preferably 30 min.–48 hours, aging, cooling, removing the flux by washing with water, drying, and heating and reducing in a hydrogen or hydrocarbon atmosphere (preferably, in propane).

As the flux, there may be mentioned chlorides such as NaCl, KCl, $MgCl_2$ and the like, sulfates such as $Li_2SO_4$, $Na_2SO_4$, $K_2SO_4$ and the like. In particular, it is preferable to use two or more kinds of fluxes in combination, and at that case, a composition near the eutectic is more preferable. However, there are excluded such a flux that can not dissolve the starting material at all when melted, a flux having a melting point of 1100° C. or higher, a flux having a boiling point of 1000° C. or lower, and a flux which can not be easily dissolved to in water or other solvents separte from the mixture of the flux and the magnetic material after the reaction.

As the binder resin used in the present invention, there may be mentioned various known resins, for example, styrene type resins (homopolymers or copolymers comprising styrene or substituted styrene)such as polystyrene, chloro-polystyrene, poly α-methylstyrene, styrenechlorostyrene copolymer, styrene-propylene copolymer, styrene-butadiene copolymer, styrene-vinyl chloride copolymer, styrene-vinyl acetate copolymer, styrenemaleic acid copolymer, styrene-acrylic acid ester copolymer (styrene-methyl acrylate copolymer, styrene-ethyl acrylate copolymer, styrene-butyl acrylate copolymer, styrene-octyl acrylate copolymer, styrene-phenyl acrylate copolymer and the like), styrene-methacrylic acid ester copolymer (styrene-methyl methacrylate copolymer, styrene-ethyl methacrylate copolymer, styrene-butyl methacrylate copolymer, styrene-phenyl methacrylate copolymer and the like), styrene-methyl α-chloroacrylate copolymer, styrene-acrylonitrile-acrylic acid ester copolymer, and the like; polyvinyl chloride, ethylene-vinyl acetate copolymer, rosin-modified maleic acid resin, phenolic resin, epoxy resin, polyester resin, low molecular weight polyethylene, low molecular weight polypropylene, ionomer resin, polyurethane resin, silicone, resin, ketone resin, ethylene-ethyl acrylate copolymer, xylene resin, polyvinyl butyral resin and the like. The above-mentioned resins may be used alone or in combination.

In addition, as a binder resin for a toner used for a pressure fixing system, there may be mentioned low molecular weight polyethylene low molecular weight polypropylene, ethylene-vinyl acetate copolymer, ethylene-acrylic acid ester copolymer, higher fatty acids, polyamide resin, polyester resin and the like. These may be used alone or in combination.

In the case of using the toner of the present invention as a magnetic color toner, if necessary, there may be added a colorant. As the colorant, there may be used known pigments or dyes.

Water-soluble dyes are not preferred since the fixed toner image is still deteriorated with water. Black pigments such as carbon black and the like are not preferable for color toner, but may be used for the purpose of improving various characteristics unless the characteristics of the toner according to the present invention are not remarkably lowered.

As the dyes, there may be mentioned C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, C.I. Basic Green 6 and the like.

As the pigments, there may be mentioned chrome yellow, cadmium yellow, Mineral Fast Yellow, Naples Yellow, Naphthol Yellow-S, Hansa Yellow G, Permanent Yellow-NCG, Tartrazine Lake, redish chrome yellow, Molybdenum Orange, Permanent Orange GTR, Pyrazolone Orange, Benzidine Orange G, Cadmium red, Permanent Red 4R, Watchung Red Calcium Salt, Eosine Lake, Brilliant Carmine 3B, Manganese Violet, Fast Violet B, Methyl Violet Lake, prussian blue, Cobalt Blue, Alkali Blue Lake. Victoria Blue Lake, Phthalocyanine Blue, Fast Sky Blue, Indanthrene Blue BC, Chromium Green, Chromium oxide, Pigment green B, malachite green Lake, Final Yellow Green G and the like.

To the toner of the present invention there may be added additives if desired. As the additives, there may be mentioned fixing auxiliary agents such as polyethylene and the like, flowability imparting agents such as colloidal silica and the like, caking inhibitors, lubricants such as metal salts of fatty acids, polytetrafluoroethylene, polyvinylidene fluoride and the like, abrasives such as cerium oxide and the like, and electroconductivizer such as tin oxide and the like metal oxides.

The magnetic toners according to the present invention may be produced by various methods such as a method comprising kneading the materials such as magnetic powders, binder resin and the like by means of heat kneading machine such as heat roll, kneader, extruder and the like and mechanically pulverizing and classifying, a method comprising dispersing magnetic powders and the like materials in a solution of binder resin and spray-drying, a method comprising mixing a monomer to form a binder resin with predetermined materials and polymerizing the emulsified suspension liquid to produce magnetic toners, and the like.

Developing latent images with the toner of the present invention may be effected by various known developing methods, e.g. a method using a conductive magnetic toner disclosed in U.S. Pat. No. 3,909,258, a method using an insulating magnetic toner disclosed in Japanese patent application Laid-open Nos.42141/1979 and 18656/1980, a method using a magnetic toner of a high electric resistance, a micro-toning developing method using a magnetic toner and a non-magnetic toner as disclosed in Japanese patent application Laid-open Nos. 83630/1978 and 24632/1979.

Among them, the method using an insulating toner disclosed in the above-mentioned Japanese patent application Laid-open Nos. 42141/1979 and 18656/1980 is particluarly preferred. That is, according to said developing method, as shown in FIG. 1, and electrostatic image holder 1 bearing electrostatic images on the surface and a developer bearing member 2 bearing an insulating magnetic developer 6 on the surface are positioned face to face at a certain distance, and the insulating magnetic developer 6 is carried on the developer bearing member 2 in the thickness thinner than the distance and the insulating magnetic developer 6 is transferred onto the electrostatic image holder 1.

In the present invention, the particle size distribution of magnetic powders was determined under a proper condition by means of Coulter Counter Model TA-II, aperture tube of 50μ in diameter.

Figure 2:
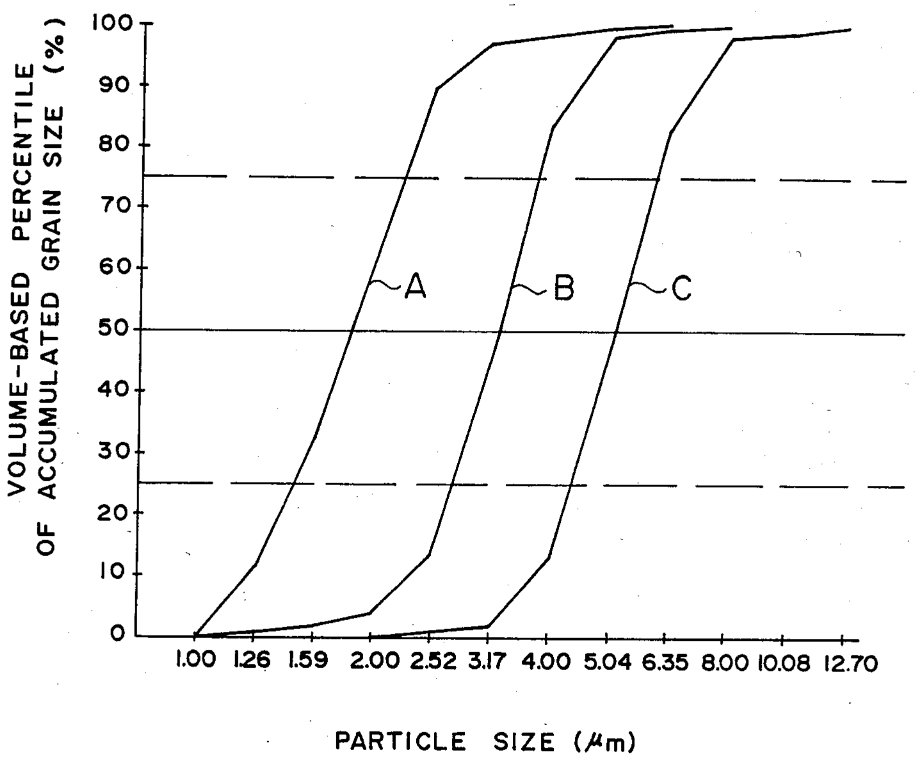
FIG. 2 is a graph showing particle size distributions of magnetic materials.

The particle size distribution of magnetic powders shown in FIG. 2 is made by plotting the three types of magnetic powders A, B and C in a graph having an ordinate representing the volume-based percentile of accumulated grain size (%) and an abscissa representing the particle size. Magnetic powders A are for a comparison example having a smaller particle size. Magnetic powder B are for the present invention and are produced by a sintering method. Magnetic powders C are for a comparison example having a larger particle size.

The following Preparation Examples illustrate processes for preparing magnetic powders through a sintering step.

PREPARATION EXAMPLE 1

α-$Fe_2O_3$ of number average particle size of 0.5 micron was heated in air at 1000° C. for 5 hours, cooled, and ground by an atomizer to produce α-$Fe_2O_3$ of number average particle size of 1.3 microns, which was then reduced in hydrogen atmosphere at 250° C., cooled and ground to produce magnetite of about 1.3 microns in the particle size. The specific surface area as determined by BET method was 1.9 $m^2/g$.

The particle size of 50% accumulated volume, that of 25% accumulated volume and that of 75% accumulated volume were 3.2μ, 2.6μ and 3.8μ, respectively.

PREPARATION EXAMPLE 2

α-$Fe_2O_3$ of number average particle size of 0.4μ was heated in air at 1100° C. for 5 hours, cooled, and ground by an atomizer to produce α-$Fe_2O_3$ of number average particle size of 1.8 microns. The resultant α-$Fe_2O_3$ was reduced at 450° C. in propane atmosphere, cooled and ground to produce magnetite of about 1.8 microns in particle size. The specific surface area measured by BET method was 1.3 $m^2/g$.

The particle size of 50% accumulated volume, that of 25% accumulated volume and that of 75% accumulated volume were 3.6.μ in size produced in Preparation Example 1 was oxidized in air at 250° C. to obtain brown $Fe_3O_4$ of 1.3μ in size a part of which was become γ-$Fe_2O_3$. The specific surface area determined by BET method was 2.0 $m^2/g$.

The particle size of 50% accumulated volume, that of 25% accumulated volume and that of 75% accumulated volume were 3.2μ, 2.5μ and 3.9μ.

In the following Preparation Examples there are illustrated methods for producing magnetic powders by a reaction in a flux in detail.

PREPARATION EXAMPLE 4

A mixture of $Li_2SO_4/Na_2SO_4$ (molar ratio of 40/60) and α-$Fe_2O_3$ having a number average particle of 0.2μ were placed in an alumina magnetic crucible and heated at 900° C. for 2 hours. After cooling, the product was washed with water to remove $Li_2SO_4$ and $Na_2SO_4$ as flux, and dried to obtain α-$Fe_2O_3$ having a number average particle size of 1.2μ. The resulting $\alpha$-$Fe_2O_3$ was reduced in propane at 450° C. to obtain a magnetite having a number average particle size of 1.2μ and a specific surface area (BET) of 1.8 $m^2/g$.

The particle size of 50% accumulated volume, that of 25% accumulated volume, and that of 75% accumulated volume were 3.0μ, 2.5μ and 3.6μ, respectivley.

PREPARATION EXAMPLE 5

The procedure of Preparation Example 4 was repeated except that a mixture of $LiSO_4/Na_2SO_4$ (molar ratio of 40/60) and $\alpha$-$Fe_2O_3$ having a number average particle size of 0.2μ was placed in an alumina magnetic crucible and heated at 900° C. for 18 hours, there was obtained a magnetite having a number average particle size of 1.9μ and a specific surface area of 1.0 $m^2/g$.

The particle size of 50% accumulated volume, that of 25% accumulated volume and that of 75% accumulated volume were 3.7μ, 2.9μ and 4.8μ, respectively.

PREPARATION EXAMPLE 6

The $Fe_3O_4$ having a number average particle size of 1.2μ obtained in Preparation Example 4 was oxidized in air at 250° C. to produce $\gamma$-$Fe_2O_3$ having a number average particle size of 1.2μ and a specific surface area of 2.0 $m^2/g$ (BET).

The particle size of 50% accumulated volume, that of 25% accumulated volume and that of 75% accumulated volume were 2.9μ, 2.4μ and 3.7μ, respectively.

The following Examples are given for illustrating the present invention. The parts are by weight. In the following, particle size of 50% accumulated volume, particle size of 25% accumulated volume and particle size of 75% accumulated volume are referred to as "50% size", "25% size" and "75% size", respectively.

EXAMPLE 1

| | |
|---|---|
| Styrene-butylacrylate-dimethylaminoethyl methacrylate copolymer (75:20:5) | 100 parts |
| Magnetic Powders (FIG. 2, Magnetic material B) (Magnetite, 50% size, 3.26μ; 25% size, 2.75μ; 75% size 3.81μ) | 60 parts |
| Low molecular weight polyethylene | 4 parts |
| Phthalocyanine Blue | 10 parts |

The above mentioned components were kneaded at 150° C. in a roll mill, cooled and roughly ground by means of a speed mill followed by finely pulverizing with a jet mill. The product thus pulverized was subjected to air elutriation to obtain the powders of 5–20μ in size. To the powders was added 0.5wt % of colloidal silica to obtain a blue magnetic toner.

The resulting magnetic toner was used for image formation by means of the apparatus in FIG. 1. On a known zinc oxide photosensitive member were formed negatively charged electrostatic latent images, and developed and transferred to form copied images as shown below. In the developing apparatus in FIG. 1, the surface magnetic flux density was 700 gauss, the distance between a blade 5 and a sleeve 2 was 0.2 mm, and the sleeve was rotatable while the magnet 3 was fixed (The peripheral speed of the sleeve is the same as that of the drum, but the direction of rotation of the sleeve is opposite to that of the drum). The distance between the surface of the photosensitive drum and the sleeve surface was set to 0.25 mm, and A. C. of 1.2 KHz and 1.2 KV and D. C. bias of −150 V were applied to the sleeve and development was effected with the blue magnetic toner to produce toner images. Then the toner images were transferred to a receiving paper while the receiving paper was irradiated with D. C. corona of −7 KV from the back side.

The developer remaining on photosensitive drum 1 was removed with a magnetic brush cleaner and the fixation was effected by means of a commercially available copying machine using plain paper (tradename, NP-200J, manufactured by Canon K.K.). There were obtained clear blue images free from fog. Further, image formation was conducted at a low temperature and a low humidity (15° C., 10% RH) and there were produced clear images of high density and free from irregularity. Even after a running test of 2000 copied sheets, clear images of high density were obtained and no change in tone was observed.

COMPARISON EXAMPLE 1

The procedure of Example 1 above was repeated except that the magnetic material A (Magnetite, 50% size, 1.83μ; 25% size, 1.47μ; 75% size, 2.2μ) in FIG. 2 was used as a magnetic material and there was obtained a magnetic toner, which was used for image formation resulting in somewhat bluish black images.

COMPARISON EXAMPLE 2

The procedure of Example 1 was repeated except that the magnetic material C in FIG. 2 (magnetite, 50% size, 5.16μ; 25% size, 4.38μ; 75% size, 6.05μ) was used as a magnetic material, and there was obtained a magnetic toner, which was used for image formation resulting in blue images, but the image quality was somewhat rough. Further, when a running test was conducted with the magnetic toner, there were formed irregular images. When image formation was conducted at a low temperature and a low humidity (15° C., 10%), irregularity was formed over the whole surface even when only about 100 sheets of copy were produced.

EXAMPLE 2

| | |
|---|---|
| Crosslinked styrene-butyl methacrylate copolymer | 100 parts |
| Magnetic material D ($\gamma$-$Fe_2O_3$, 50% size, 2.96μ; 25% size, 2.37μ; 75% size, 3.16μ) | 70 parts |
| Chromium complex of 3,5-di-tert-butyl salicylic acid | 2 parts |
| Low molecular weight polyethylene | 5 parts |
| Brilliant Carmine 6B | 8 parts |

By repeating the procedure of Example 1 by using the above ingredients, there was produced a red magnetic toner, and image formation was effected by a commercially available copying machine (trade name, NP-200J, manufactured by Canon K.K.) to produce clear red images having a practically sufficient image density.

Further, the magnetic toner was subjected to a 10,000 repetition durability test, and any undesirable image quality (irregularity, fog and the like) was not observed. Such undesirable image quality was not observed even when the toner was supplied. In addition, such undesirable image quality was not observed even under low humid conditions.

EXAMPLE 3

| | |
|---|---|
| Crosslinked styrene-butyl methacrylate copolymer | 100 parts |
| Magnetic material E (Magnetite, 50% size, 3.58μ; 25% size, 2.74μ; 75% size, 4.72μ) | 60 parts |
| Chromium complex of 3,5-di-tert-butyl salicylic acid | 2 parts |
| Low molecular weight polyethylene | 5 parts |
| Phthalocyanine blue | 10 parts |

By repeating the procedure of Example 1 using the above mentioned ingredients, there was produced a blue toner, which was then used for image formation with a commercially available copying machine (tradename, NP-200J, manufactured by Canon K.K.) to produce clear blue images of high density. Even when a durablity test for producing 10,000 sheets of copy or a test under a low humidity, there was not observed any undesirable image quality.

EXAMPLE 4

| | |
|---|---|
| Styrene-butadiene copolymer (70:30) | 100 parts |
| Chromium complex of 3,5-di-tert-butyl salicylic acid | 2 parts |
| Magnetite (Preparation Example 1) | 60 parts |
| C.I. Direct Blue-2 | 10 parts |
| Polyethylene | 3 parts |

The above mentioned ingredients were kneaded at 150° C. by means of a roll mill, cooled mill, finely divided by a jet mill and subjected to air elutriation to obtain a blue magnetic toner.

The resulting blue magnetic toner was used for image formation by using a commercially available copying machine (tradename, NP-201, manufactured by Canon K.K.) to produce clear images free from fog and of good fixability.

EXAMPLE 5

| | |
|---|---|
| Styrene-methyl methacrylate copolymer (60:40) | 100 parts |
| Chromium complex of 3,5-di-tert-butyl salicylic acid | 2 parts |
| Magnetite (Preparation Example 2) | 50 parts |
| C.I. Direct Green 6 | 15 parts |
| Polyethylene | 3 parts |

The above mentioned ingredients were made into a toner by following the procedure of Example 4.

The resulting toner was used for image formation resulting in green images of good image quality and tone.

EXAMPLE 6

The procedure of Example 4 was repeated except that the magnetic material produced by Preparation Example 3 was used in place of magnetite of Preparation Example 1 and C.I. Direct Red 4 was used in place of C.I. Direct Blue 2. There were obtained red images having clear lines and good fixability.

COMPARISON EXAMPLE 3

By repeating the procedure of Example 4 except that a magnetite having a number average particle size 1.3μ (50% size, 1.9μ; 25% size, 1.5μ; 75% size, 2.3μ) produced by a wet process without subjected to sintering was used in place of the magnetite of Preparation Example 1, there were produced blue images having a dark and turbid tone and a poor fixability.

EXAMPLE 7

| | |
|---|---|
| Styrene-butadiene copolymer (70:30) | 100 parts |
| Chromium complex of 3,5-di-tert-butyl salicylic acid | 2 parts |
| Magnetite (Preparation Example 4) | 60 parts |
| C.I. Direct Blue-2 | 10 parts |
| Polyethylene | 3 parts |

The above mentioned ingredients were kneaded at 150° C. in a roll mill, cooled, roughly ground in a speed mill, pulverized by a jet mill and subjected to air elutriation to obtain a blue magnetic toner.

The resulting blue magnetic toner was used for image formation by means of a commercially available copying machine (tradename, NP-201, manufactrued by Canon K.K.) to produce clear images free from fog and of good fixability

EXAMPLE 8

| | |
|---|---|
| Styrene-methyl methacrylate copolymer (60:40) | 100 parts |
| Chromium complex of 3,5-di-tert-butyl salicylic acid | 2 parts |
| Magnetite (Preparation Example 5) | 50 parts |
| C.I. Direct green 6 | 15 parts |
| Polyethylene | 3 parts |

The above mentioned ingredients were made into a toner following the procedure of Example 7. The resulting toner was used for image formation resulting in green images of good image quality and tone.

EXAMPLE 9

By repeating the procedure of Example 7 except that the magnetic material of Preparation Example 6 was used in place of the magnetite of Preparation Example 4 and C.I. Direct Red 4 was used in Place of C.I. Direct Blue 2, there were produced clear red images having clear lines and good fixability.

COMPARISON EXAMPLE 4

By repeating the procedure of Example 7 except that the magnetite produced in Preparation Example 4 was replaced by a magnetite having a number average particle size of 1.2μ(50% size, 1.8μ; 25% size, 1.4μ; 75% size, 2.3μ) produced by a wet method and not subjected to a reaction in a flux, there were obtained turbid blue images of dark tone and of poor fixability.

What we claim is:

1. A magnetic color toner comprising a colorant, magnetic powders and binder resin, said colorant having a color different from that of the magnetic powder, characterized by the particle size distribution of the magnetic powders that the particle size of 50% accumulated volume, the particle size of 25% accumulated volume and the particle size of 75% accumulated volume of the magnetic powders are 1.5–4.5μ, 1.0–4.0μ and 2.5–6.0μ, respectively.

2. A magnetic toner according to claim 1 in which the particle size of 50% accumulated volume is 2.0–4.0μ.

3. A magnetic toner according to claim 1 in which the particle size of 25% accumulated volume is 1.5–3.5μ.

4. A magnetic toner according to claim 1 in which the particle size of 75% accumulated volume is 3.0–5.0μ.

5. A magnetic toner according to claim 1 in which the magnetic powders are produced by sintering.

6. A magnetic toner according to claim 1 in which the magnetic powders are produced by a reaction step in a flux.

7. A magnetic toner according to claim 1 in which the amount of the magnetic powders is 20–120 parts by weight per 100 parts by weight of the binder resin.

8. A magnetic toner which comprises magnetic powders subjected to sintering and a binder resin.

9. A magnetic toner according to claim 8 in which the amount of the magnetic powders is 20–120 parts by weight per 100 parts by weight of the binder resin.

10. A magnetic toner according to claim 8 in which the number average particle size of the magnetic powders is 0.5–3.5 microns.

11. A magnetic toner according to claim 8 in which the specific surface area of the magnetic powders measured by the BET nitrogen adsorption method is 0.5–3.0 $m^2/g$.

12. A magnetic toner according to claim 8 in which the sintering is effected at 700° C.–1300° C. for 30 minutes or more.

13. A magnetic toner according to claim 8 in which the magnetic powders are reduced after the sintering.

14. A magnetic toner which comprises magnetic powders subjected to a reaction in a flux and a binder resin.

15. A magnetic toner according to claim 14 in which the amount of the magnetic powders is 20–120 parts by weight per 100 parts by weight of the binder resin.

16. A magnetic toner according to claim 14 in which the number average particle size of the magnetic powders is 0.5–3.5μ.

17. A magnetic toner according to claim 14 in which the specific surface area of the magnetic powders measured by the BET nitrogen adsorption method is 0.5–3.0 $m^2/g$.

18. A magnetic toner according to claim 14 in which the reaction in a flux is a heating reaction effected at 700°–1300° C. for 30 minutes or more.

19. A magnetic toner according to claim 14 in which the flux is selected from the group consisting of NaCl, KCl and $MgCl_2$.

20. A magnetic toner according to claim 14 in which the flux is selected from the group consisting of $Li_2SO_4$, $Na_2SO_4$ and $K_2SO_4$.

21. A magnetic toner according to claim 14 in which the flux is a mixture two or more kinds of fluxes.

22. A magnetic toner according to claim 14 in which the flux is a mixture of $Li_2SO_4$ and $Na_2SO_4$.

23. A magnetic toner according to claim 14 in which the magnetic powders are reduced after the reaction in a flux.

* * * * *

UNITED STATES PATENT AND TRADEMARK OFFICE

CERTIFICATE OF CORRECTION

PATENT NO. : 4,543,312

DATED : September 24, 1985

INVENTOR(S) : KAZUNORI MURAKAWA, ET AL.

It is certified that error appears in the above-identified patent and that said Letters Patent is hereby corrected as shown below:

COLUMN 4

Line 17, ".-48" should read -- -48 --.

COLUMN 6

Line 57, "3.9μ." should read --3.9μ, respectively.--.

Signed and Sealed this

Twenty-fourth Day of March, 1987

*Attest:*

DONALD J. QUIGG

*Attesting Officer* *Commissioner of Patents and Trademarks*